United States Patent Office
3,728,325
Patented Apr. 17, 1973

3,728,325
POLYMERIZATION OF CONJUGATED
POLYOLEFINS
Carl J. Carlson and Samuel E. Horne, Jr., Akron, Ohio,
assignors to The B. F. Goodrich Company
No Drawing. Filed Apr. 21, 1955, Ser. No. 503,027
Int. Cl. C08d 1/14, 3/12
U.S. Cl. 260—94.3                        3 Claims

ABSTRACT OF THE DISCLOSURE

Conjugated polyolefin hydrocarbons are polymerized to rubbery or resinous polymers having essentially an all 1,4 structure with catalysts containing titanium compounds. The cis- and trans-1,4-ratios can be varied by adjustment of the titanium to aluminum ratio of the catalyst.

---

This invention relates to the polymerization of conjugated polyolefin hydrocarbons either alone or in admixture with each other. In more particular this invention relates to a method, involving the use of a new class of catalysts, of controlling or directing the polymerization of conjugated polyolefins in such a manner as to lead to the formation of polymers having unique structures, and correspondingly unique properties, by reason of the polymerization occurring entirely or almost entirely by 1,4 addition, with little or no polymerization occurring by other types of addition of the monomer units in the polymer chain.

When polymerizing conjugated polyolefin hydrocarbons by previously known methods, the monomer units enter into the polymer structure by 1,4 addition polymerization and also by other types of addition, principally 1,2 addition, with an appreciable proportion, more than 5%, of the units being derived by polymerization occurring by mechanisms other than 1,4 addition. To illustrate, butadiene-1,3, the simplest possible conjugated diolefin, polymerizes by all previously known methods to give a structure containing both 1,4-units (I) and 1,2-units (II) in varying proportions, depending upon the conditions of the polymerization, but with each type of unit present to an appreciable extent.

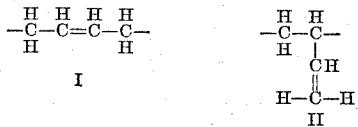

Similarly isoprene (2-methyl butadiene-1,3) polymerizes to give 1,4-units (III) and addition also occurs 1,2 at the substituted double bond to give 1,2-units (IV) and at the unsubstituted double bond to give 3,4-units (V).

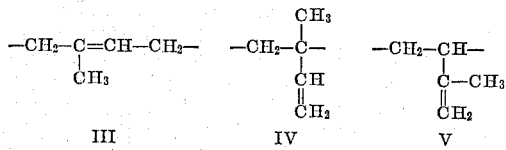

Other hydrocarbons containing conjugated double bonds likewise polymerize by several mechanisms including 1,4 and 1,2 addition, so that polymers thereof have heretofore lacked the uniformity of structure which would result if it were possible for substantially all the units derived from the conjugated hydrocarbon to be present in the 1,4 structure.

The 1,4-units present in polymers of conjugated diolefins may also exist in both cis and trans configurations about the double bond, and they be united to adjacent units in both "head to head and tail to tail" and "head to tail" fashions. The properties of a polymer are greatly influenced by the nature of the 1,4-units. For example, it is known that the natural rubber hydrocarbon, produced by nature rather than by polymerization methods, has a regular isoprene 1,4 all-cis, head to tail structure while that of the balata hydrocarbon molecule, likewise produced by nature, has the regular isoprene 1,4 all-trans, head to tail structure. Synthetic preparation of conjugated diolefin polymers having the diolefin units present in a uniform manner, as in all 1,4 structure, desirably all-cis or all-trans head-to-tail, has long been a prime objective of research in diolefin polymerization, but no techniques have heretofore been devised which will produce the desired result.

Accordingly it is a general object of this invention to provide a method for directing or controlling the polymerization of conjugated polyolefin hydrocarbons in such a manner as to lead to formation of a higher proportion, than heretofore possible, of 1,4-units in the polymer structure. Within this general object, other more specific objects are the provision of a method for directing the polymerization of aliphatic conjugated alkadiene hydrocarbons to produce substantially all 1,4 addition; a method for polymerizing butadiene-1,3 to form essentially an all 1,4 polybutadiene; a method for polymerizing isoprene to form an essentially all 1,4 polyisorpene, particularly an essentially all-trans 1,4 polyisoprene having a structure essentially that of natural balata; a method for polymerizing an aliphatic conjugated alkadiene hydrocarbon having six to ten carbon atoms to yield a polymer of a uniform 1,4 structure; and a method for polymerizing a mixture of conjugated alkadiene hydrocarbons to produce a polymeric material in which the units derived from each conjugated alkadiene are essentially all present in the 1,4 structure.

These and various other objects are attained according to this invention by bringing monomeric hydrocarbon material consisting of conjugated polyolefin hydrocarbon, into contact with a catalyst (termed herein a heavy metal catalyst) of a particular type, as hereinafter set forth, whereby the catalyst rapidly brings about and directs the polymerization of the conjugated polyolefin in the 1,4 fashion, to produce highly useful polymeric materials of a rubbery or resinous nature having essentially uniform structures and unique combinations of properties, rendering them more suitable for a variety of purposes than polymeric materials heretofore known.

The monomeric hydrocarbon material which is polymerized according to this invention may be a single conjugated polyolefin hydrocarbon or it may be a mixture of any two or more of such hydrocarbons. The aliphatic conjugated diolefin alkadiene hydrocarbon may be a butadiene-1,3 hydrocarbon, such as butadiene 1,3 (which is the simplest conjugated diolefin) or a methyl-substituted butadiene-1,3, that is, isoprene or piperylene; or it may be a conjugated aliphatic alkadiene, whether or not a butadiene-1,3 hydrocarbon containing 6 to 10 carbon atoms such as 2,3-dimethyl-butadiene-1,3; 2-ethyl-butadiene-1,3; 4-methyl-pentadiene-1,3; 2-methyl-pentadiene-1,3; 4-methyl-hexadiene-1,3; 2,4-dimethyl-pentadiene-1,3; 2-isopropyl-butadiene-1,3; 1,1,3 - trimethyl-butadiene - 1,3; 2,5,5-trimethyl-hexadiene-1,3; 2-amyl-butadiene-1,3; 1,1-dimethyl-3-tertiary-butyl-butadiene-1,3; 2-neopentyl-butadiene-1,3, or the like. Other conjugated polyolefin hydrocarbons are hexatriene 1,3,5-myrcene, dimethyl-fulvene phenyl-butadiene-1,3; 2,3-diphenyl-butadiene-1,3; diphenyl-fulvene and the like. Mixtures of any two, three or more of such conjugated polyolefins or alkadiene hydrocarbons may be used.

The heavy metal catalyst employed is made up of metal atoms which are all titanium atoms, or are titanium atoms and aluminum atoms, connected to radicals capable of joining to metal atoms in organometallic compounds, at least one of such radicals being an organic radical connected to a titanium atom through a carbon atom. In this definition of catalyst the term "radicals capable of joining to metal atoms in organometallic compounds" includes (1) organic radicals capable of linking to metal through carbon such as alkyl radicals, aryl radicals, cycloalkyl radicals and other hydrocarbon radicals, all of which are sometimes hereafter designated as "R," (2) oxy hydrocarbon radicals such as alkoxy radicals, aryloxy radicals, etc., (3) organic salt-forming radicals such as the acetate radical, the oxalate radical, the acetyl-acetone radical, etc., (4) inorganic salt-forming radicals such as halogen atoms (that is, fluorine, chlorine, bromine and iodine atoms) as well as oxyhalide radicals, etc. and (5) hydrogen atoms, all such radicals (1) to (5) being sometimes hereinafter designated as "X."

The above definition of catalysts useful in this invention includes catalysts which are made up of a single organometallic compound having as its metallic portion a titanium atom, which titanium atom is connected by at least one of its valences to a carbon atom of an organic radical, and it also includes catalysts made up by bringing together two components, one of which is an organo aluminum compound in which a carbon atom of an organic group is attached to an aluminum and the other of which is a simple compound such as a salt of titanium the organo-aluminum compound and the titanium compound each having the metal atoms connected only to radicals of the type set forth above. There is also included catalysts formed by reacting the titanium in activated form with an olefinic compound (which may be the same as the olefinic compound later polymerized) which provides the organic radical linked by carbon to the titanium atom.

Catalysts which are single chemical compounds include those compounds of the formula $(R)_a$—Ti—$(X)_b$ wherein R and X have the significance set forth and $a$ and $b$ are integers totaling the valence of titanium. Catalysts made up of a combination of chemical compounds, which are generally preferred because of the instability and difficulty of preparation of compounds of the $(R)_a Ti(X)_b$ type, include the following combinations:

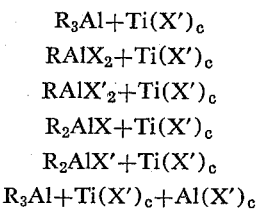

X' represents a salt-forming X radical and $c$ represents the maximum valence of titanium. Preefrred catalysts of all the above types are those wherein:

R is an alkyl radical such as ethyl, propyl, butyl, isobutyl, amyl, hexyl, octyl, dodecyl etc., or a substituted alkyl such as phenylethyl, or an aryl radical such as phenyl,
X is hydrogen or halogen or oxyhydrocarbon,
X' is halogen, preferably chlorine.

Catalysts of most pronounced directive influence for polymerization of aliphatic conjugated polyolefin hydrocarbons are those in which there is a combination of aluminum atoms and titanium atoms alkyl radicals and halogen atoms since the use of such catalysts not only directs the polymerization of polyolefin hydrocarbons in the 1,4 manner, but also makes it possible, in many instances, by suitably adjusting the ratio of titanium to aluminum, to produce 1,4-polymers which are all-cis or all-trans, as will be hereinafter described.

One method for producing the titanium aluminum catalyst consists in bringing together an organo-aluminum compound such as preferably a trialkyl aluminum or a dialkyl aluminum halide, hydride or alkoxide together with a titanium salt, preferably a halide and especially titanium tetrachloride, whereby a reaction occurs between the two metal components to produce the catalyst. In preparing catalysts by such a reaction the reactants are brought together at any desired temperature, preferably room temperature, in the absence of free oxygen and water, preferably in the absence of any materials other than the metal compounds and hydrocarbon materials, for example, inert hydrocarbon solvents or diluents, and particularly in the absence of active hydrogen compounds such as alcohols, amines, acids, etc., oxygen yielding compounds such as peroxides and other types of compounds such as ethers, esters, ketones, sulfides, etc., as well as free oxygen and water. The reaction is best brought about by adding the metal components to an inert hydrocarbon solvent or diluent such as a saturated alkane, among which are butane, hexane, heptane, octane, cetane or the like, or mixtures thereof, such as Deobase kerosine, or the mixture of alkanes resulting from the Fischer-Tropsch process or a cycloalkane such as cyclohexane or methyl cyclohexane or a benzene hydrocarbon such as benzene, toluene or xylene. It is important that the hydrocarbon solvent or diluent be free from oxygen and water, and preferably that it also be free from peroxides, bivalent sulfur compounds, and various other impurities.

The reaction between the aluminum metal compound and the titanium compound leading to the formation of the catalyst is generally rapid and exothermic. For example, when titanium tetrachloride is introduced into a hexane solution of triethyl aluminum in the absence of oxygen and water, the solution assumes a dark color with formation of a black, difficultly soluble material. A similar material is produced when there is used, in place of triethyl aluminum, a trialkyl aluminum in which the alkyl groups contain four or more carbon atoms such as triisobutyl aluminum, and this material is even more preferred since it has an advantage of being more dispersible in the diluent and the resulting solution is less flammable and safer to handle. It is also possible to carry out the reaction between the aluminum compound and the titanium compound in such a manner as to avoid formation of difficultly-soluble colored material. For example, pure triethyl aluminum may be added to hexane or other hydrocarbon solvent, the solution completely saturated with a stream of ethylene, then titanium tetrachloride and aluminum chloride added, thereby to produce a soluble catalyst.

In the practice of this invention the polymerization of a conjugated polyolefin hydrocarbon is carried out by bringing the monomeric hydrocarbon, preferably in highly purified condition, into contact with the heavy metal catalyst, preferably in the presence of a hydrocarbon solvent which may be any of those hydrocarbons disclosed hereinafter as solvents or diluents for use in connection with preparation of the catalyst, and also preferably in the absence of other materials, particularly oxidizing materials such as oxygen and peroxides and materials containing active hydrogen atoms, such as water, acids, alcohols, etc. Neither the temperature nor the pressure at which the monomeric hydrocarbon is brought into contact with the catalyst is critical, it being possible to use temperatures as low as −100° C. or as high as +100° C., and to use pressures of one atmosphere or above or below atmospheric. Ordinarily it is preferred to introduce the monomeric hydrocarbon in liquid form into a solution or dispersion of the catalyst in the hydrocarbon solvent, while maintaining an inert gas such as nitrogen over the solution or disperison to avoid contact with air, but without imposing any pressure other than that produced by the vapors of the materials present, and to maintain the solution or dispersion at a temperature of −20 to 80° C., preferably about 5 to 50° C. Under these conditions the monomeric hydrocarbon polymerizes in solution with either an increase in viscosity to produce a solution of the polymer in the solvent, or with precipitation of polymer from the solvent to give a dispersion of polymeric material in the solvent. The polymerization normally requires a time of 30 minutes to 20 hours, although more rapid or longer polymerizations are possible depending upon the monomers used and the polymerization conditions.

The relative amounts of hydrocarbon solvent, catalyst and monomeric hydrocarbon used in the polymerization process may be varied quite widely. It is ordinarily desirable to use an amount of hydrocarbon solvent in excess of monomeric hydrocarbon. For example, the use of 1 to 30, preferably 8 to 20 times as much hydrocarbon solvent as hydrocarbon monomer by volume, is suitable. The amount of catalyst is generally in the range of 0.1 to 20 percent by weight based on the weight of monomeric hydrocarbon being polymerized, with the amount of catalyst being taken, in case more than one catalyst compound is used, as the combined weight of the metal compounds used in making the catalyst. When isoprene is polymerized to trans-1,4-polyisoprene the catalyst concentration is preferably in the range of 1.0 to 20 percent by weight based on the weight of isoprene monomer.

After polymerization the polymer product is present in the reaction mixture either in solution or dispersion. It may be separated from the solvent and from catalyst residues by any of the conventional methods. In case the polymer product dissolves in the solvent, one preferred method for separation consists in extracting the solution with methanol to remove catalyst residues and then to add a solvent such as acetone which is miscible with the hydrocarbon solvent, but in which the polymer product is insoluble, thereby precipitating the product in finely-divided form. In case the product is a dispersion in the solvent, it can be filtered from the reaction mixture and extracted with methanol. The polymer product obtained by either method can be washed, dried and processed in the usual manner.

The polymer products so produced are in general resinous or rubbery materials, ordinarily of a substantially linear structure, of high molecular weight, that is, a molecular weight generally about 5,000 and ordinarily above 10,000, and sometimes as high as 1,000,000 or higher. In the polymer products there are generally more than 95% of the units derived from the polyolefin hydrocarbon present in the polymer chain in the 1,4 arrangement; and in this respect the products differ from known polyolefin polymers which have at least 5%, and generally more, of their polyolefin units present in other than 1,4 arrangements.

Specific properties of the polymer products vary from one to another depending upon the nature of the monomeric hydrocarbon material being polymerized and the catalyst used. When the monomeric hydrocarbon is butadiene-1,3, by itself, and the catalyst is the preferred titanium aluminum catalyst, it is possible to produce different types of 1,4 polybutadienes depending on the molar ratio of titanium to aluminum in the catalyst. For example, when the Ti/Al molar ratio is about 0.5:1 to 1.5:1, the product is a 1,4 mixed cis and trans rubbery polybutadiene, as is illustrated herein in Examples 9 to 16, but when the Ti/Al molar ratio is 1.5:1 to 3:1, the product is a 1,4 all-trans polybutadiene which is a crystalline resinous product of a leathery or balata-like nature. The preparation of trans-1,4-polybutadiene is more particularly described and claimed in our copending application Ser. No. 503,028, filed Apr. 21, 1955, now U.S. Pat. No. 3,657,209.

When the monomeric hydrocarbon material is isoprene by itself, and the catalyst is the preferred titanium aluminum catalyst, it is likewise possible to produce different 1,4 polyisoprenes depending on the molar Ti/Al ratio. At Ti/Al ratios of 0.5:1 to 1.5:1 there is produced an all-cis 1,4 head-to-tail polyisoprene structure substantially identical with the structure of the natural rubber hydrocarbon, as is more particularly disclosed and claimed in the copending application of Samuel E. Horne, Jr., Serial No. 472,786, filed Dec. 2, 1954 now U.S. Pat. No. 3,114,743. At Ti/Al ratios of about 1.5:1 to 3:1 the polyisoprene is of the all-trans 1,4 head-to-tail structure substantially identical with the balata hydrocarbon, while at higher Ti/Al ratios the 1,4 polyisoprene is a noncrystalline high melting polymeric powder similar in properties to but of a somewhat different structure than the purified natural products. The preparation of 1,4 polyisoprenes other than the 1,4 all-cis head-to-tail polymer is illustrated in Examples 1 to 8 herein.

The use of aliphatic conjugated alkadiene hydrocarbon materials other than butadiene-1,3 alone or isoprene alone, for example, mixtures of butadiene and isoprene with each other or with other conjugated polyolefins, or aliphatic conjugated alkadiene hydrocarbons containing 6 to 10 carbon atoms alone or with other aliphatic conjugated alkadiene hydrocarbons results in the obtainment of rubbery polymers or high melting powdered polymers in all of which the alkadiene units are derived by 1,4 polymerization. Such polymers differ widely from known alkadiene polymers in that they are stronger and of a more regular structure, essentially free from units derived by 1,2 addition polymerization.

The 1,4 alkadiene polymers made by this invention contain unsaturation by reason of the presence of alkadiene units and hence are readily oxidizable. Therefore, it is desirable to add an antioxidant to the polymer as soon as possible after it is formed, this being done conveniently in case the polymer is in hydrocarbon solution when prepared, by including an antioxidant such as phenyl-beta-naphthylamine or an equivalent, in the non-hydrocarbon solvent, such as methanol, which is used to precipitate the polymer from the solvent, or in case the polymer is obtained in dispersion in hydrocarbon solvent, by addition of antioxidant to the polymer during the process of separating it from the hydrocarbon solvent or by thereafter milling it into the polymer.

Processing, compounding and vulcanizing of the 1,4 polymers of this invention may be effected if desired by known procedures, and the polymers may be used for the same multifarious purposes as the known naturally-occurring and synthetically-prepared alkadiene polymers.

The practice of the invention and the products obtained thereby are further illustrated by the following examples in which the parts, unless otherwise indicated, are by weight. Where parts by volume are specified, the appropriate parts needed by weight are obtainable by multiplying parts by volume by density. If the weight units chosen are grams, the volume units are milliliters.

EXAMPLE 1

There is added to 150 parts by volume of dewatered benzene 0.99 part (5 millimols) of triisobutyl aluminum and then 1.9 parts (10 millimols) of anhydrous titanium tetrachloride, giving a molar ratio of titanium to aluminum of 2 to 1. On addition of the titanium tetrachloride the solution, previously at room temperature, becomes slightly warm and assumes a dark color as a result of reaction between the triisobutyl aluminum and the titanium tetrachloride. This catalyst solution is aged for 30 minutes at room temperature and then diluted with additional dewatered benzene to contain 19.2 millimols of titanium per liter of solvent.

While keeping the diluted catalyst solution so prepared under an atmosphere of nitrogen, there is added to the catalyst solution 50 parts of liquid monomeric isoprene which has been carefully distilled and dried to remove impurities and water. The temperature of the solution is held at about 5° C. The vapors of isoprene and solvent above the solution are condensed and returned to the reaction mixture, but otherwise no attempt is made to carry out the addition of isoprene under pressure.

After addition of isoprene, stirring is continued and the temperature is controlled at 5° C. until about 2 hours have elapsed since starting the addition of isoprene. After one hour or less has elapsed, it is noted that the benzene solution is becoming more viscous and that a greater amount of cooling is required to control the temperature, indicating that an exothermic polymerization is occurring.

The reaction mixture is then extracted twice with 1,000 parts by volume of methanol which removes the color, and precipitates the polymer as a solvated mass. About 0.7 part by weight of the polymer of phenyl-beta-naphthylamine (an antioxidant) is kneaded into the polymer to protect it against oxidation. The polymer is then water washed and dried. There is obtained 50 parts of polyisoprene which is equivalent to 100% yield.

When the polyisoprene so produced is examined with the infrared spectrophotometer, it is found to possess a spectrum whose bands establish the fact that the polyisoprene produced is an all 1,4 polyisoprene, with substantially no isoprene units resulting from 1,2 addition or 3,4 addition. Essentially all of the 1,4 units show the trans configfiuration. The polymer spectrum is remarkably like that of washed, de-resinated natural balata, which is all-trans 1,4- polyisoprene. The polyisoprene of this example crystallizes in the same form as the naturally-occurring trans 1,4 polyisoprene.

The trans 1,4 polyisoprene of this example is compounded in the following golf ball cover composition:

| Material: | Parts |
|---|---|
| Trans 1,4 polyisoprene | 100 |
| Titanium dioxide | 25 |
| Zinc oxide | 10 |
| Zinc stearate | 3 |
| Sulfur | 5 |
| Piperidine pentamethylene dithiocarbamate | 0.5 |

When the golf ball cover stock is molded about a golf ball center using heat and pressure in the conventional manner, a golf ball having properties similar to a golf ball covered with a balata cover is obtained.

EXAMPLE 2

The procedure of Example 1 is again followed, using 1.9 parts (10 millimols) of titanium tetrachloride, 0.99 part (5 millimols) of triisobutyl aluminum (Ti/Al ratio of 2 to 1; 18.7 millimols of Ti per liter of solvent). 46 parts of purified isoprene are added and agitation is continued for about 4 hours at 50° C. A polymer yield of 41 parts or 89% is obtained. The polymer is tough in appearance and under infrared study is shown to be a trans 1,4 polyisoprene.

EXAMPLE 3

Again the general procedure of Example 1 is followed using 1.9 parts (10 millimols) of titanium tetrachloride, 1.1 parts (5.7 millimols) of triisobutyl aluminum (ratio of Ti/Al=1.75/1.; 19.2 millimols of Ti per liter of solvent). 46 parts of isoprene are added and the temperature is maintained at 50° C. for 16.6 hours. A yield of 82.7% is obtained. The product is a polymeric powder having a softening point of 150° C. Infrared examination shows it to be largely trans 1,4 polyisoprene.

Examples 1, 2 and 3 indicate that variations in catalyst ratio and reaction temperature are not critical to the process of this invention.

EXAMPLES 4 to 6

These examples follow the procedure of Example 1, employing benzene solvent, a temperature of 5° C. and 50 parts of monomeric isoprene in each case. The ratio of titanium/aluminum is maintained at 2/1, but the total amount of catalyst is varied to determine the effective concentration of catalyst.

| Example | TiCl₄, mm. | Al(iC₄H₉)₃, mm. | Catalyst concentration (mm. Ti/liter) | Percent yield | Time, hours |
|---|---|---|---|---|---|
| 4 | 10 | 5 | 19.5 | 100 | 21.7 |
| 5 | 4 | 2 | 7.6 | 94 | 22.0 |
| 6 | 3 | 1.5 | 5.8 | 30 | 21.5 |

This series of examples shows that catalyst level, calculated as millimols of titanium per liter of solvent, should preferably be above 5 in order to insure fastest polymerization of the monomeric isoprene.

EXAMPLE 7

Again following the procedure of Example 1, 1.9 parts of titanium tetrachloride (10 millimols) and 0.5 part of triisobutyl aluminum (2.5 millimols) (Ti/Al ratio=4/1) are dissolved in benzene to give a titanium level of 19.5 millimols per liter of solvent. 46 parts of isoprene are added and polymerization is conducted 4 hours at 50° C. After precipitation, washing and drying, a yield of 73.9% is obtained in the form of a white polymeric powder with a softening point of 165° C.

EXAMPLE 8

Again the general procedure of Example 1 is followed except that n-heptane replaces benzene as the solvent and the Ti/Al ratio is held at 3/1. Ti level is 18.7 millimols per liter of solvent; polymerization is conducted 4½ hours at 50° C. Since heptane is the solvent, wash alcohol only extracts catalyst residues. 500 parts by volume of acetone are added after the first wash to precipitate the polymer, which after water washing and drying shows a 22.2% yield of polymeric powder that melts at 145° C.

EXAMPLE 9

Preparation of catalyst and polymerization of butadiene follows the general procedure of Example 1 where isoprene was the monomer used. 2.85 parts of titanium tetrachloride (15 millimols) and 2.99 parts of triisobutyl aluminum (15 millimols) are mixed and aged in benzene, then diluted with benzene to a catalyst strength of 28.4 millimols titanium per liter of solution. 55 parts of liquid, purified monomeric butadiene are added and polymerization is conducted at 50° C. for about 17 hours. Methyl alcohol containing phenyl-beta-naphthylamine antioxidant is added to precipitate and wash the polymer. After drying, a 60% yield is obtained of a strong rubbery 1,4 polybutadiene.

EXAMPLE 10

The procedure of Example 9 is followed except that the ratio of Ti/Al is set at 0.667/1. A 22.2% yield is obtained of a sticky rubbery 1,4 polybutadiene.

When examined in the infrared spectrophotometer, the products of Examples 9 and 10 exhibit mixed cis and trans 1,4 structure with essentially no 1,2 structure, indicating that both ranges of catalyst proportions used directed the polymerization to the 1,4 type. This is desirable since presence of 1,2 polymer tends to make the product too soft and weak for practical use.

EXAMPLES 11 and 12

The procedure of Example 9 is followed with polymerization of 50 parts of purified monomeric butadiene at 50° C. for 18½ hours in benzene. The Ti/Al ratio is kept at 1%1, but catalyst concentration is varied.

| Example | TiCl₄, mm. | Al(iC₄H₉)₃, mm. | Catalyst concentration (mm. Ti/liter) | Percent yield |
|---|---|---|---|---|
| 11 | 1.90 | 1.99 | 18.75 | 60 |
| 12 | 0.95 | 0.99 | 9.37 | 60 |

A strong rubbery product which is a 1,4 polybutadiene is obtained in both examples.

EXAMPLES 13 and 14

The procedure of Example 9 is followed employing different solvents and again soft, rubbery, 1,4 polybutadiene materials are obtained.

Example:                         Solvent employed
13 ----------------------------- Pentane
14 ----------------------------- Toluene

EXAMPLES 29 to 34

Employing the procedure of Example 1, isoprene is copolymerized with various other aliphatic conjugated alkadienes. Monomer proportions, catalyst ratios, catalyst concentrations, solvent, temperatures and times of polymerization are varied from run to run. Infrared spectrophotometer shows that in each case the monomer addition has been substantially the 1,4 type. The products are all tacky, vulcanizable, rubbery materials.

ISOPRENE-CONJUGATED POLYOLEFINS

| Example | Comonomer | Percent isoprene/ percent comonomer | Ti/Al mm. | Catalyst concentration | Solvent [2] | Temp., °C. | Time, hours | Yield, percent |
|---|---|---|---|---|---|---|---|---|
| 29 | Buadiene-1,3 | 50/50 | 1/1 | 19.9 | B | 50 | 16 | 66 |
| 30 | Methylpentadiene-1,3 | 50/50 | 1/1 | 17.1 | B | 50 | 4.5 | 100 |
| 31 | do | 50/50 | 2/1 | 18.9 | B | 50 | 4.25 | 67 |
| 32 | 2,3-dimethylbutadiene-1,3 | 50/50 | 1/1 | 19.9 | T | 50 | 16 | 40 |
| 33 | do | 50/50 | 1/1 | 20.0 | B | 50 | 4 | 75 |
| 34 | 2,5-dimethylhexadiene-2,4 | 50/50 | 1/1 | 15.1 | B | 50 | 4 | 20 |

[1] Mm. Ti/liter.   [2] B indicates benzene; T, toluene.

EXAMPLES 15 and 16

The procedure of Example 9 is followed with polymerization of 50 parts of purified monomeric butadiene at 5° C. for 22 hours in benzene. The Ti/Al ratio is kept at 1/1 but catalyst concentration is varied.

| Example | TiCl$_4$, mm. | Al(iC$_4$H$_9$)$_3$, mm. | Catalyst concentration (mm. Ti/liter) | Percent yield |
|---|---|---|---|---|
| 15 | 10 | 10 | 18.7 | 80 |
| 16 | 5 | 5 | 9.17 | 66 |

The products of Examples 15 and 16 are strong, rubbery, 1,4 polybutadienes having a somewhat higher molecular weight than those of Examples 9 to 14, perhaps as a result of having been made at the lower temperature.

EXAMPLES 17 to 28

Various other conjugated polyolefin monomers all of which are conjugated aliphatic alkadiene hydrocarbons except those used in Examples 26 to 28 are substituted for isoprene in the general procedure of Example 1. Several different solvents, catalyst ratios, catalyst concentrations and polymerization times are employed. Temperature is held at 50° C. in every case. In each case the product is a rubbery or resinous polymer whose structure indicates that the catalysts of this invention direct the polymerization preferentially toward the 1,4-structure and away from other structures.

EXAMPLES 35 and 36

Employing the general procedure of Example 31, butadiene is user as the primary monomer, replacing isoprene. Copolymerizations of butadiene with two representative aliphatic, conjugated alkadiene hydrocarbons are run. Benzene solvent and a temperature of 50° C. are used in each case. Infrared spectra show that most or all of the units in the polymer chains produced are the result of 1,4 addition of the monomers. The products again are rubbery, vulcanizable materials.

| Example | Comonomer | Percent butadiene/ percent comonomer | Ti/Al, mm. | Catalyst concentration (mm. Ti/ liter | Time, hours | Yield, percent |
|---|---|---|---|---|---|---|
| 35 | Mixed methylpentadienes | 50/50 | 1/1 | 19.3 | 4 | 60 |
| 36 | 2-methylpentadiene | 50/50 | 1/1 | 18.9 | 4.4 | 67 |

While the above examples have illustrated the invention, it will be understood that the invention is not limited to the details thereof and that many modifications and variations are within the spirit and scope of the invention as defined in the appended claims.

We claim:

1. The method for directing the polymerization of isoprene to produce synthetic polyisoprene having an essentially all trans-1,4 structure so as to be substantially identical with the naturally occurring balata hydrocarbon, which method comprises the steps of mixing monomeric isoprene with an excess ranging from 1 to 30 times the volume of said isoprene with a liquid hydrocarbon solvent selected from the class consisting of alkanes, cycloalkanes and benzene hydrocarbons, said solvent containing a catalyst made by combining in said solvent components (a) and (b) which on contact with each other in said solvent at

| Example | Monomer | Ti/Al Ratio | Catalyst concentration mm./liter | Solvent | Time, hours | Yield, percent |
|---|---|---|---|---|---|---|
| 17 | 2,3-dimethyl butadiene-1,3 | 1/1 | 11.0 | Heptane | 7 | 51 |
| 18 | do | 1/1 | 20.0 | Benzene | 4 | 72.5 |
| 19 | do | 3/1 | 20.0 | do | 4 | 80 |
| 20 | do | 0.63/1 | 10.0 | do | 4 | 10 |
| 21 | Trans-piperylene | 1/1 | 16.0 | do | 16 | 53 |
| 22 | do | 2/1 | 16.7 | do | 16 | 63 |
| 23 | Methyl pentadiene (mixed) | 1/1 | 19.3 | do | 4 | 48 |
| 24 | 2-methyl pentadiene-1,3 | 2/1 | 16.9 | do | 4.3 | 73 |
| 25 | Neopentyl butadiene-1,3 | 1/1 | 20.0 | do | 16 | 42 |
| 26 | Myrcene | 2/1 | 79.3 | do | 65 | 64 |
| 27 | do | 1/1 | 39.4 | do | 65 | 64 |
| 28 | Cyclopentadiene | 1/1 | 18.9 | do | 16.8 | 96 | normal temperature and pressure undergo immediate reaction with change in color, component (a) being a trialkyl aluminum containing from 2 to 8 carbon atoms in each alkyl group and component (b) being titanium tetrachloride, the amounts of components (a) and (b) being regulated to provide a molar ratio of titanium to aluminum of from 1.75 to 1 to about 3 to 1 and to provide a combined amount of (a) and (b) from 1 to 20 percent by weight based on the weight of said monomeric isoprene, agitating the resulting mixture under autogenous pressure at a temperature of −20 to 80° C. for a time sufficient to polymerize said isoprene, and separating from said mixture high molecular weight, solid polyisoprene having said trans-1,4 structure.

2. The method of claim 1 wherein the trialkyl aluminum is triisobutyl aluminum.

3. The method of claim 1 wherein the amount of components (a) and (b) is regulated to provide a molar ratio of titanium to aluminum of about 2 to 1.

References Cited
UNITED STATES PATENTS 3,114,743   12/1963   Horne _____ 260—194.3

HARRY WONG, JR., Primary Examiner

E. J. SMITH, Assistant Examiner

U.S. Cl. X.R.

252—429 A; 260—82.1